US012147200B2

(12) United States Patent
Nicoud et al.

(10) Patent No.: US 12,147,200 B2
(45) Date of Patent: Nov. 19, 2024

(54) METHOD FOR MANUFACTURING A HOROLOGICAL DISC AND HOROLOGICAL DISC OBTAINED BY ITS IMPLEMENTATION

(71) Applicant: ETA SA MANUFACTURE HORLOGÈRE SUISSE, Grenchen (CH)

(72) Inventors: Serge Nicoud, Couvet (CH); Sébastien Roder, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 245 days.

(21) Appl. No.: 17/692,303

(22) Filed: Mar. 11, 2022

(65) Prior Publication Data

US 2022/0334539 A1 Oct. 20, 2022

(30) Foreign Application Priority Data

Apr. 16, 2021 (EP) .................................... 21168779

(51) Int. Cl.

| | |
|---|---|
| ***G04D 3/00*** | (2006.01) |
| ***C25D 3/12*** | (2006.01) |
| ***C25D 7/00*** | (2006.01) |
| ***G04B 15/14*** | (2006.01) |

(52) U.S. Cl.
CPC ............ *G04D 3/0069* (2013.01); *C25D 3/12* (2013.01); *C25D 7/00* (2013.01); *G04B 15/14* (2013.01)

(58) Field of Classification Search
None
See application file for complete search history.

(56) References Cited

U.S. PATENT DOCUMENTS

2017/0146954 A1 5/2017 Charbon

FOREIGN PATENT DOCUMENTS

| | | |
|---|---|---|
| CH | 698230 B1 | 1/2011 |
| CN | 514 873 A | 7/1971 |
| CN | 698 230 B1 | 1/2011 |

(Continued)

OTHER PUBLICATIONS

Machine translation of Amano et al. JP 2009228893 A (Year: 2009).*

(Continued)

*Primary Examiner* — Wojciech Haske
(74) *Attorney, Agent, or Firm* — Sughrue Mion, PLLC

(57) ABSTRACT

A method for manufacturing a horological mobile (10) including: depositing a first thin layer (11) with a first material including at least nickel, the periphery of which defines the contour of the geometry of the horological mobile (10); depositing an intermediate layer (12), with a second material including at least nickel and phosphorus, so as to cover a face of the first thin layer (11), the periphery of which corresponds to that of the geometric shape of the first thin layer (11); depositing a second thin layer (13) with the first material, so as to cover a face of the intermediate layer (12), the periphery of which corresponds to that of the geometric shape of the first thin layer (11), wherein the first and the second thin layer (11, 13) are poorer in phosphorus than the intermediate layer (12), or do not contain any phosphorus.

16 Claims, 1 Drawing Sheet

(56) References Cited

FOREIGN PATENT DOCUMENTS

| | | | |
|---|---|---|---|
| CN | 707 562 | A2 | 8/2014 |
| EP | 1 927 648 | A1 | 6/2008 |
| EP | 3 432 079 | A1 | 1/2019 |
| JP | 2009-228893 | A | 10/2009 |
| JP | 2017-96925 | A | 6/2017 |
| WO | 2008/052378 | A3 | 5/2008 |

OTHER PUBLICATIONS

Kurosaka et al., "Characteristics of electroless nickel plating films", Electroless Ni—P plating, vol. 65, No. 3, pp. 118-122, 2014 (6 pages).

European Search Report for EP 21168779 dated Sep. 10, 2021.

* cited by examiner

METHOD FOR MANUFACTURING A HOROLOGICAL DISC AND HOROLOGICAL DISC OBTAINED BY ITS IMPLEMENTATION

CROSS-REFERENCE TO RELATED APPLICATIONS

This application claims priority to European Patent Application No. 21168779.3 filed Apr. 16, 2021, the entire contents of which are incorporated herein by reference.

TECHNICAL FIELD OF THE INVENTION

The invention belongs to the field of micromechanical components, and more precisely that of horological mobiles, in particular of the escapement mechanisms including at least one escapement wheel and at least one set of pallets, at least one of the two of which is of a non-magnetic nature.

The invention relates in particular to a method for manufacturing a micromechanical component, in particular a horological mobile.

Technological background

The horological escapement mechanisms with pallets of the prior art generally comprise escapement wheels made from nickel-plated steel. These escapement wheels are sensitive to magnetic fields.

To overcome the disadvantages resulting from this sensitivity to magnetic fields, escapement wheels have been developed with materials having a non-magnetic behaviour, such as the nickel-phosphorus (NiP12) implemented in particular by a "LIGA" method (from the German "Röntgenlithographie, Galvanoformung, Abformung", meaning lithography, electroplating, moulding).

However, the use of such materials can turn out to be sensitive in certain climatic conditions, insofar as they are capable of leading to a degradation of the performance, in particular in terms of regularity of amplitude, of stoppages, or of ageing.

This degradation of the performance is even greater when two antagonistic components cooperating with one another so as to produce a friction torque are made from similar LIGA materials.

In particular, it is crucial to prevent any pollution of the pallets, in particular of the pallets fork, and to ensure the presence of lubricant on the contact surfaces of the escapement wheel and of the pallets, in particular, the contact between the gathering-pallet made of ruby of the pallets and the tooth of the escapement wheel, in order to limit the ageing of the escapement wheel and of the pallets.

The main problem is the loss of epilame effect on the plate of the escapement wheel, which causes a spreading of the oil and a loss of lubrication at the contact between the tooth of the wheel and the gathering-pallet made of ruby.

The stability of the lubrication at the contact between the gathering-pallets of the pallets and the escapement wheel must allow to guarantee the consistency of the amplitude.

SUMMARY OF THE INVENTION

The invention intends to solve the technical problem of the hold of the usual horological lubricant, and more particularly of guaranteeing an epilame effect, in all climatic conditions, on components made of LIGA NiP12, or similar, non-ferromagnetic, in particular on pallets and Swiss lever escapement wheels.

For this purpose, the invention relates to a method for manufacturing a horological mobile, comprising the successive steps of:

depositing a first thin layer with a first material including at least nickel, according to a geometric shape, the periphery of which defines the contour of the geometry of the horological mobile, depositing an intermediate layer, with a second material including at least nickel and phosphorus, so as to cover a face of the first thin layer and so as to have a geometric shape, the periphery of which corresponds to that of the geometric shape of the first thin layer, depositing a second thin layer with the first material, so as to cover a face of the intermediate layer and so as to have a geometric shape, the periphery of which corresponds to that of the geometric shape of the first thin layer.

The first and the second thin layer are poorer in phosphorus than the intermediate layer, or do not contain any phosphorus.

In specific embodiments, the invention can further include one or more of the following features, taken alone or according to all the technically possible combinations.

In specific embodiments, the intermediate layer is superimposed on the first thin layer and the second thin layer is superimposed on the intermediate layer, respectively at at least one interface face contiguous to at least one friction face of the horological mobile intended to be in contact with another horological component.

In specific embodiments, the steps of depositing the first thin layer, the intermediate layer and the second thin layer are implemented by LIGA.

In specific embodiments, the second material consists only of nickel and of phosphorus.

In specific embodiments, the second material has a proportion by weight of phosphorus between 1% and 15%.

In specific embodiments, the second material is made from NiP12.

In specific embodiments, the first material includes only pure nickel, or only nickel and phosphorus.

In specific embodiments, the first material comprises a proportion by weight of phosphorus less than or equal to 9%.

In specific embodiments, the first material comprises a proportion by weight of phosphorus between 6% and 9%.

In specific embodiments, the first material comprises a proportion by weight of phosphorus between 1% and 6%.

In specific embodiments, the first material comprise a proportion by weight of phosphorus between 0% and 1%.

In specific embodiments, the first material comprises boron.

The boron allows the first and second layers to have better tribological and hardness properties.

In specific embodiments, the first material consists only of nickel and boron.

In specific embodiments, the first material has a thickness between 0.2 micrometres and 10 micrometres.

In specific embodiments, a heat treatment is applied to an assembly formed by the first thin layer, the intermediate layer, and the second thin layer, at a temperature between 100° C. and 500° C., for 1 to 8 hours.

In specific embodiments, the method is applied to the manufacturing of an escapement mobile which is an escapement wheel or pallets.

In specific embodiments, the first thin layer, the intermediate layer and the second thin layer are deposited so that the horological mobile formed includes, in the orientation and in the direction of growth of deposition of said layers, a gradient of concentration of phosphorus defined by a progressive increase through the first thin layer, a stable state through the intermediate layer and a decrease through the second thin layer.

According to another object, the present invention relates to a horological mobile manufactured by the implementation of the method described above, and comprising an intermediate layer interposed between a first thin layer and a second thin layer, said thin layers being made from a first material including at least nickel, the intermediate layer being made from a second material including at least nickel and phosphorus, the first and the second thin layer being poorer in phosphorus than the intermediate layer, or not containing any phosphorus.

In specific embodiments, the horological mobile forms an escapement wheel or pallets.

BRIEF DESCRIPTION OF THE DRAWINGS

Other features and advantages of the invention will appear upon reading the following detailed description given as an example that is in no way limiting, in reference to the appended drawings in which.

It is noted that the drawings are not to scale.

DETAILED DESCRIPTION OF THE INVENTION

Figure 2:
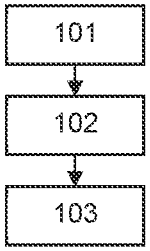
FIG. 2 shows a flowchart illustrating the steps of the method for manufacturing a horological mobile according to the invention.

The present invention relates in particular to a method for manufacturing a horological mobile 10, the steps of which are shown by the flowchart of FIG. 2.

The manufacturing method comprises the successive steps of:

- depositing 101 a first thin layer 11, or a substrate, with a first material including at least nickel, according to a geometric shape, the periphery of which defines the contour of the geometry of the horological mobile 10, the thickness of said first thin layer 11 being less than 5 micrometres,
- depositing 102 an intermediate layer 12, with a second material including at least nickel and phosphorus, so as to cover a face of the first thin layer 11, and so as to have a geometric shape, the periphery of which corresponds to that of the geometric shape of the first thin layer,
- depositing 103 a second thin layer 13 with the first material, so as to cover a face of the intermediate layer 12 and so as to have a geometric shape, the periphery of which corresponds to that of the geometric shape of the first thin layer 11.

Figure 1:
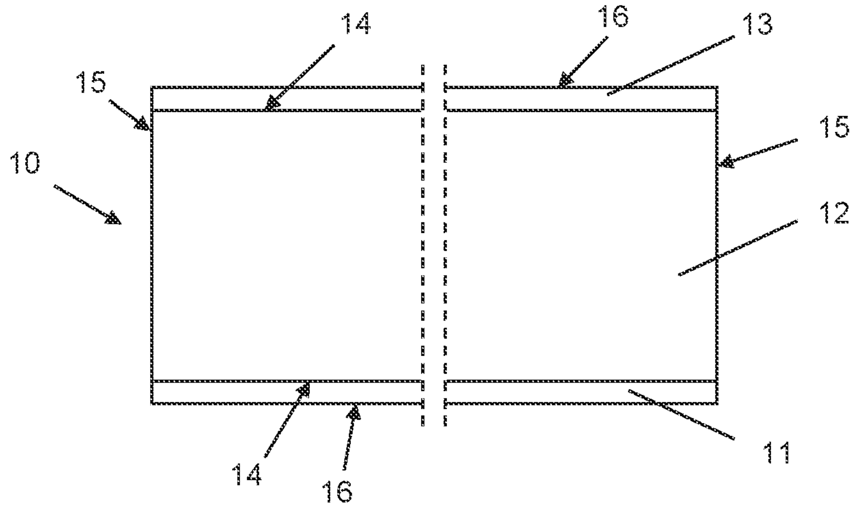
FIG. 1 schematically shows a cross-sectional view of a horological mobile obtained by the implementation of the method for manufacturing a horological mobile according to the invention.

The thickness of said second thin layer 13 is substantially equal to the thickness of the first thin layer 11, as shown by the horological mobile schematically shown in FIG. 1, the sum of said thicknesses being several times less than that of the intermediate layer 12.

Preferably, the periphery of the geometric shape of the first thin layer 11 defines the contour of the geometry of an escapement wheel or of pallets, so that the horological mobile 10 obtained by the implementation of the method according to the present invention is an escapement wheel or pallets, or the pallet-stones of pallets.

Preferably, the first and the second thin layer 11 and 13 and the intermediate layer 12 are deposited according to a LIGA method, according to a predefined direction of growth of deposition, perpendicular to a plane in which the geometric shape of the first thin layer 11 extends.

Preferably, the first and the second thin layer 11 and 13 and the intermediate layer 12 are configured to have non-magnetic properties.

It should be noted that the first material and the second material are not necessarily non-magnetic, it is in this case the small thickness of each layer that confers its non-magnetic nature on the part.

In an example of an embodiment of the invention, the first and the second thin layer 11 and 13 can be made from nickel galvanically. Alternatively, they can be made from a nickel alloy galvanically, for example, Ni—Fe, or Ni—W, or other.

Alternatively, the deposition of the first and of the second thin layer 11 and 13 can be carried out chemically, according to a method for applying chemical nickel, for example pure nickel, nickel-phosphorus poor in phosphorus, for example NiP6-9, with 6% to 9% by weight of phosphorus, with a proportion by weight of phosphorus between 0% and 1% or between 1% and 6%, or nickel-boron (NiB).

The first and the second thin layer 11 and 13 are advantageously poorer in phosphorus than the intermediate layer 12, or do not contain any phosphorus.

Via this feature, the invention allows to increase the stability of the epilame in usual climatic conditions, to increase the adherence of the epilame, and thus the hold of any usual horological lubricant.

Thus, the present invention allows to greatly improve the performance of the movements.

Indeed, it has been demonstrated by various tests that these effects on the epilame are obtained when the quantity of phosphorus on the surface is reduced.

In an example of an embodiment of the invention, the first thin layer 11 and the second thin layer 13 each have a thickness of less than 10 micrometres, and particularly between 0.2 micrometres and 5 micrometres, and preferably between 0.2 micrometres and 2 micrometres.

In an example of an embodiment of the invention, the intermediate layer 12 is of at least 100 micrometres.

In a specific example of an embodiment of the invention, the intermediate layer 12 is made from nickel-phosphorus having the formulation NiPx, with x between 1% and 15% by weight, or more particularly with x between 10% and 15% by weight, the latter range allowing to guarantee the non-magnetic nature of the coating.

Preferably, the intermediate layer 12 is made from NiP12.

The intermediate layer 12 can consist only of nickel and of phosphorus. Moreover, it can be made galvanically or chemically.

It is possible to apply a heat treatment to the horological mobile 10 formed by the assembly of the layers.

More particularly, the heat treatment can involve subjecting an assembly formed by the first thin layer 11, the intermediate layer 12, and the second thin layer 13 to a temperature between 100° C. and 500° C., for 1 to 8 hours.

Alternatively or in addition, it is possible to apply a chemical treatment to the surface of the first thin layer 11 and to the surface of the intermediate layer 12 to modify its surface-state characteristics so as to facilitate the adhesion of the following layer, that is to say of the intermediate layer 12 or of the second thin layer 13. This chemical treatment can in particular be carried out galvanically.

The method according to the invention is implemented by LIGA.

The invention allows to guarantee normal ageing conditions of the horological mobile 10, a consistency of the amplitude, and the absence of stoppage.

As shown by FIG. 1, the intermediate layer 12 is superimposed on the first thin layer 11 and the second thin layer 13 is superimposed on the intermediate layer 12, respectively at at least one face called "interface face" 14, contiguous to at least one contact face called "friction face" 15 of the horological mobile 10 intended to be in contact with another horological mobile or component. The term "contiguous" means that the interface face 14 and the friction face 15 are neighbouring without there being an interval. In other words, they are secant at a common edge. The friction face(s) 15 can also constitute the guide surfaces of the horological mobile 10 for its pivoting or for its guiding according to a single degree of freedom.

In other words, the friction face(s) 15 correspond to the straight section of the first and second thin layers 11 and 13 and of the intermediate layer 12. Preferably, the horological mobile 10 includes several friction faces 15.

Thus, the friction faces 15 advantageously consist for the most part of the second material insofar as the sum of the thicknesses of the first and of the second thin layer 11 and 13 is relatively small with respect to the thickness of the intermediate layer 12, for example by a factor of at most one tenth.

This feature is advantageous insofar as the friction is carried out on a surface mainly consisting of nickel-phosphorus, which has good tribological properties.

The first and the second thin layer 11 and 13 also have faces opposite to one another forming end faces 16 of the horological mobile 10.

Another advantage of the method according to the present invention lies in the fact of obtaining a one-piece horological mobile, which, in comparison to possible manufacturing methods of the prior art, allows to eliminate a step of depositing a coating.

An example of an embodiment of the invention in which the first thin layer 11, the intermediate layer 12, and the second thin layer 13 each have a single concentration of phosphorus has been described above.

However, it is possible in another example of an embodiment of the invention for the first thin layer 11, the intermediate layer 12 and the second thin layer 13 to be deposited so that the horological mobile 10 formed includes, in the orientation and the direction of growth of deposition of said layers, a gradient of concentration of phosphorus defined for example by a progressive growth through the first thin layer 11, a stable state through the intermediate layer 12 and a progressive decrease through the second thin layer 13.

The concentration gradient comprises the phosphorus concentration values mentioned above in the present invention description.

For example, the concentration of phosphorus can change from a value of zero in the end face 16 of the first thin layer 11 up to a maximum of 12% by weight in the intermediate layer 12, then decrease so as to reach a value of zero in the end face 16 of the second thin layer 13.

The invention claimed is:

1. A method for manufacturing a horological mobile (10), comprising successive steps of:

depositing (101) a first thin layer (11) with a first material including at least nickel, according to a geometric shape, the periphery of which defines the contour of the geometry of the horological mobile (10);

depositing (102) an intermediate layer (12), with a second material including at least nickel and phosphorus, so as to cover a face of the first thin layer (11) and so as to have a geometric shape, the periphery of which corresponds to that of the geometric shape of the first thin layer (11); and depositing (103) a second thin layer (13) with the first material, so as to cover a face of the intermediate layer (12) and so as to have a geometric shape, the periphery of which corresponds to that of the geometric shape of the first thin layer (11), wherein the first and the second thin layer (11, 13) being poorer in phosphorus than the intermediate layer (12), or not containing any phosphorus, and wherein the first material includes only pure nickel, or only nickel and phosphorus.

2. The method according to claim 1, wherein the intermediate layer (12) is superimposed on the first thin layer (11) and the second thin layer (13) is superimposed on the intermediate layer (12), respectively at at least one interface face (14) contiguous to at least one friction face (15) of the horological mobile (10) intended to be in contact with another horological component.

3. The method according to claim 2, wherein the steps of depositing (101, 102 and 103) the first thin layer (11), the intermediate layer (12) and the second thin layer (13) are implemented by LIGA.

4. The method according to claim 1, wherein the second material consists only of nickel and of phosphorus.

5. The method according to claim 1, wherein the second material has a proportion by weight of phosphorus between 1% and 15%.

6. The method according to claim 5, wherein the second material is made from NiP12.

7. The method according to claim 1, wherein the first material comprises a proportion by weight of phosphorus less than or equal to 9%.

8. The method according to claim 7, wherein the first material comprise a proportion by weight of phosphorus between 0% and 1%.

9. The method according to claim 1, wherein the first material comprises boron.

10. The method according to claim 9, wherein the first material consists only of nickel and of boron.

11. The method according to claim 1, wherein the first material has a thickness between 0.2 micrometres and 10 micrometres.

12. The method according to claim 1, wherein a heat treatment is applied to an assembly formed by the first thin layer (11), by the intermediate layer (12) and the second thin layer (13), at a temperature between 100° C. and 500° C., for 1 to 8 hours.

13. The method according to claim 1, characterised in that it is applied to the manufacturing of an escapement mobile which is an escapement wheel or pallets.

14. A method for manufacturing a horological mobile (10), comprising successive steps of:

depositing (101) a first thin layer (11) with a first material including at least nickel, according to a geometric shape, the periphery of which defines the contour of the geometry of the horological mobile (10);

depositing (102) an intermediate layer (12), with a second material including at least nickel and phosphorus, so as to cover a face of the first thin layer (11) and so as to have a geometric shape, the periphery of which corresponds to that of the geometric shape of the first thin layer (11); and depositing (103) a second thin layer (13) with the first material, so as to cover a face of the intermediate layer (12) and so as to have a geometric shape, the periphery of which corresponds to that of the geometric shape of the first thin layer (11), wherein the first and the second thin layer (11, 13) being poorer in phosphorus than the intermediate layer (12), or not containing any phosphorus, and wherein the first material comprises a proportion by weight of phosphorus between 6% and 9%.

15. A method for manufacturing a horological mobile (10), comprising successive steps of:

depositing (101) a first thin layer (11) with a first material including at least nickel, according to a geometric shape, the periphery of which defines the contour of the geometry of the horological mobile (10);

depositing (102) an intermediate layer (12), with a second material including at least nickel and phosphorus, so as to cover a face of the first thin layer (11) and so as to have a geometric shape, the periphery of which corresponds to that of the geometric shape of the first thin layer (11); and depositing (103) a second thin layer (13) with the first material, so as to cover a face of the intermediate layer (12) and so as to have a geometric shape, the periphery of which corresponds to that of the geometric shape of the first thin layer (11), wherein the first and the second thin layer (11, 13) being poorer in phosphorus than the intermediate layer (12), or not containing any phosphorus, and wherein the first material comprises a proportion by weight of phosphorus between 1% and 6%.

16. A method for manufacturing a horological mobile (10), comprising successive steps of:

depositing (101) a first thin layer (11) with a first material including at least nickel, according to a geometric shape, the periphery of which defines the contour of the geometry of the horological mobile (10);

depositing (102) an intermediate layer (12), with a second material including at least nickel and phosphorus, so as to cover a face of the first thin layer (11) and so as to have a geometric shape, the periphery of which corresponds to that of the geometric shape of the first thin layer (11); and depositing (103) a second thin layer (13) with the first material, so as to cover a face of the intermediate layer (12) and so as to have a geometric shape, the periphery of which corresponds to that of the geometric shape of the first thin layer (11), wherein the first and the second thin layer (11, 13) being poorer in phosphorus than the intermediate layer (12), or not containing any phosphorus, wherein the first thin layer (11), the intermediate layer (12) and the second thin layer (13) are deposited so that the horological mobile (10) formed includes, in the orientation and in the direction of growth of deposition of said layers, a gradient of concentration of phosphorus defined by a progressive increase through the first thin layer (11), a stable state through the intermediate layer (12) and a decrease through the second thin layer (13).

* * * * *